United States Patent [19]

Hirahara

[11] Patent Number: 4,984,170

[45] Date of Patent: Jan. 8, 1991

[54] AUTOMATIC TICKET VENDING MACHINE

[75] Inventor: Kazuaki Hirahara, Ibaraki, Japan

[73] Assignee: Omron Tataeisi Electronics Co., Kyoto, Japan

[21] Appl. No.: 287,333

[22] Filed: Dec. 21, 1988

[30] Foreign Application Priority Data

Dec. 28, 1987 [JP] Japan ................... 62-333091

[51] Int. Cl.$^5$ ............................................. G07B 15/02
[52] U.S. Cl. ..................... 364/464.01; 194/209; 235/378; 235/384; 364/401
[58] Field of Search ............... 194/209; 235/378, 384; 364/401, 407, 464.01

[56] References Cited

U.S. PATENT DOCUMENTS

| 3,897,862 | 8/1975 | James | 194/209 |
| 4,608,488 | 8/1986 | Hirose et al. | 235/384 |
| 4,720,785 | 1/1988 | Shapiro | 235/384 X |
| 4,758,954 | 7/1988 | Takiguchi | 235/384 X |
| 4,794,530 | 12/1988 | Yukiura et al. | 235/384 X |

Primary Examiner—Parshotam S. Lall
Assistant Examiner—Edward R. Cosimano
Attorney, Agent, or Firm—Dickstein, Shapiro & Morin

[57] ABSTRACT

Two different values of fare or fee are previously stored, and tickets are issued or vended at the first fare or fee in specific day and time and at the second fare or fee in other day and time. That is, tickets can be vended through an automatic ticket vending machine at different fare or fee varied according to a specified time zone or a specified day of the week.

4 Claims, 3 Drawing Sheets

AUTOMATIC TICKET VENDING MACHINE

BACKGROUND OF THE INVENTION

1. Field of the Invention

The present invention relates to an automatic ticket vending machine for vending (e.g. railroad) passenger tickets or admission (entrance) tickets, and in particular to an automatic ticket vending machine for vending tickets whose fare or fee varies according to day and/or time.

2. Description of the Prior Art

In some traffic facilities or recreation facilities, daytime-reduced fare tickets or night-reduced fee tickets are issued or the fare or fee is reduced in weekdays as compared in holidays or according to a day of the week or a time zone, in order to increase the number of passengers, users, visitors, etc.

In these cases, conventionally, since fare or fee of tickets varies according to days of the week or times, it has been impossible to use an automatic ticket vending machine, and therefore these tickets have been vended by clerks.

Therefore, in some traffic facilities or recreation facilities, there exists a problem in that clerks must be assigned at ticket windows at all times, thus resulting in an increase in labor cost.

SUMMARY OF THE INVENTION

With these problems in mind, therefore, it is the primary object of the present invention to provide an automatic ticket vending machine which can vend various tickets whose fare or fee varies according to days of the week or time.

To achieve the above-mentioned object, an automatic ticket vending machine, according to the present invention comprises: (a) memory means for storing a first fare or fee and a second fare or fee different from the first fare or fee; (b) calendar means for storing specified day and time; (c) clock means for measuring day and time; and (d) ticket issuing means for issuing first tickets at the first fare or fee when the day and time output from said clock means match those stored in said calendar means and second tickets at the second fare and fee when the day and time output from said clock means do not match those stored in said calendar means.

In the automatic ticket vending machine according to the present invention, tickets are vended at a first fare or fee at specific day and time and at a second fare or fee at other day and time. The specified day and time is stored in the calendar means. The specified day and time is a daytime zone of weekdays, for instance, and the first fare or fee is a reduced fare or fee. Therefore, it is possible to vend tickets whose fare or fee varies according to daytime or nighttime by setting these values.

As described above, in the automatic ticket vending machine according to the present invention, since it is possible to vend tickets at a first fare or fee determined for specified day and time (time zone), which is different from a second fare or fee determined for other day and time, tickets can be vended at different fare or fee according to different time zones and/or different days of the week, thus economizing window clerks for vending tickets or promoting ticket vending and checking-in operation automatization.

DETAILED DESCRIPTION OF THE PREFERRED EMBODIMENT

Figure 1:
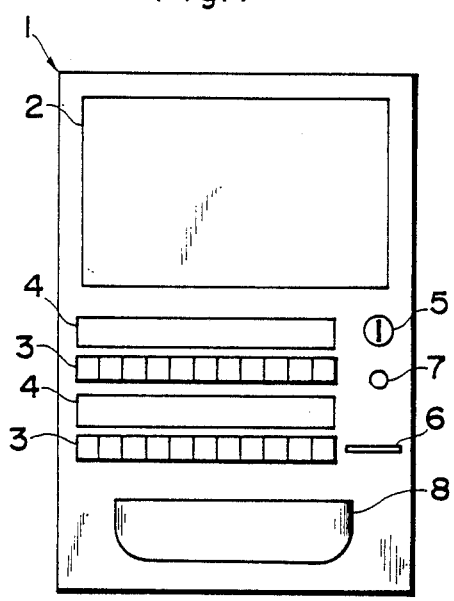
FIG. 1 is an outside front view showing an automatic ticket vending machine of the present invention.

FIG. 1 is a front view showing an automatic ticket vending machine 1 as one embodiment of the present invention, which is suitable for use in a railway ticket vending machine. A console panel is arranged on the front surface of the machine as shown in the drawing. On the upper side of this console panel, there is provided a display section 2 on which railway routes, station names, fare, etc. are displayed. At the middle portion of the console panel, there are arranged a plurality of destination keys 3 corresponding to a railway section (a group of stations formed by partitioning the stations along a railway) and a plurality of panels 4 on which various station names of the railway section, arranged at two lines, respectively. In addition, a coin insertion slot 5, a bill insertion slit 6, a child indicating key 7 are provided on the right side. These destination keys 3 are pushbutton switches which include an LED matrix display unit to indicate a railway fare corresponding to each railway section. In this case, railway sections or stations corresponding to or within the amount of cash inserted in the ticket vending machine, are displayed. Further, a railway ticket and change (coins) are discharged through a discharge chute 8 provided at the lower portion of the console panel.

Figure 2:
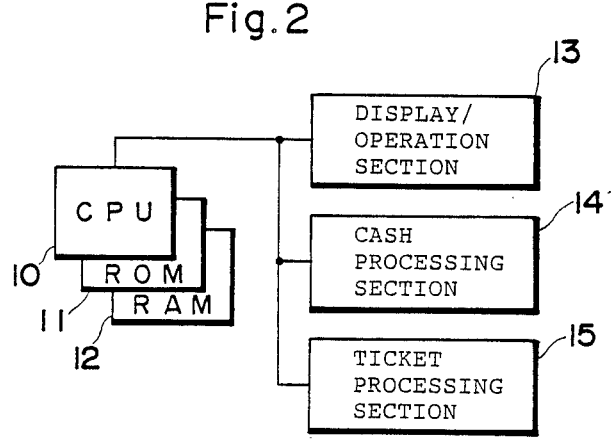
FIG. 2 is a block diagram showing the control section of the automatic ticket vending machine.

FIG. 2 is a block diagram of a controller section incorporated in the automatic ticket vending machine. To a CPU 10 for controlling the entire operation of the machine, there are connected a ROM 11 for storing programs and railway fare tables, a RAM 12 for storing the amount of inserted cash, a display/operation section 13 for displaying a destination determined by a destination key 3 or a fare indicated above destination key 3, a cash processing section 14 for discriminating inserted coins and/or bills, counting the amount of coins and/or bills, determining the amount of change (coins) to be discharged, and a ticket processing section 15 for issuing a railway ticket. This ticket processing section 15 is provided with a thermal printer and/or a magnetic encoder to print (encode) various ticket data (such as fare, section, issue station, etc.) on a paper formed with a magnetic material area on the reverse side and a thermosensible material area on the surface thereof.

Figure 4:
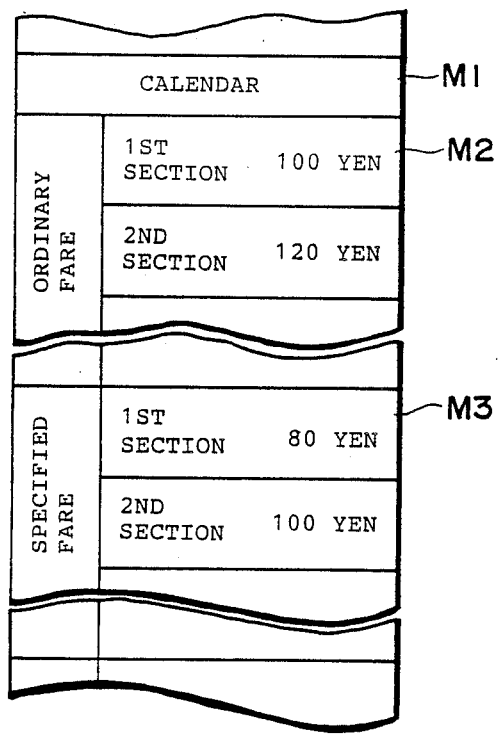
FIG. 4 is a partial memory area configuration of the control section.

FIG. 4 shows a partial memory area of the ROM 11, in which an area M1 denotes a calendar area in which a calendar including days and days of the week and specified time zones (within which railway tickets are vended at specific railway fares lower than the ordinary fares) are stored. The specified time zone is "from 10 to 16 o'clock on weekdays", for instance within which railway tickets are vended at special fares, that is, the daytime during weekdays, for instance. The above specified time is measured by the CPU 10. Further, an area M2 denotes a ordinary railway fare table and an area M3 denotes a special railway fare table, in each of which various fares determined according to various railway sections are stored. Therefore, whenever cash is inserted, the ordinary fare table or the special fare table are read out and further a fare corresponding to the railway section is displayed on each one of destination keys 3.

Figure 3:
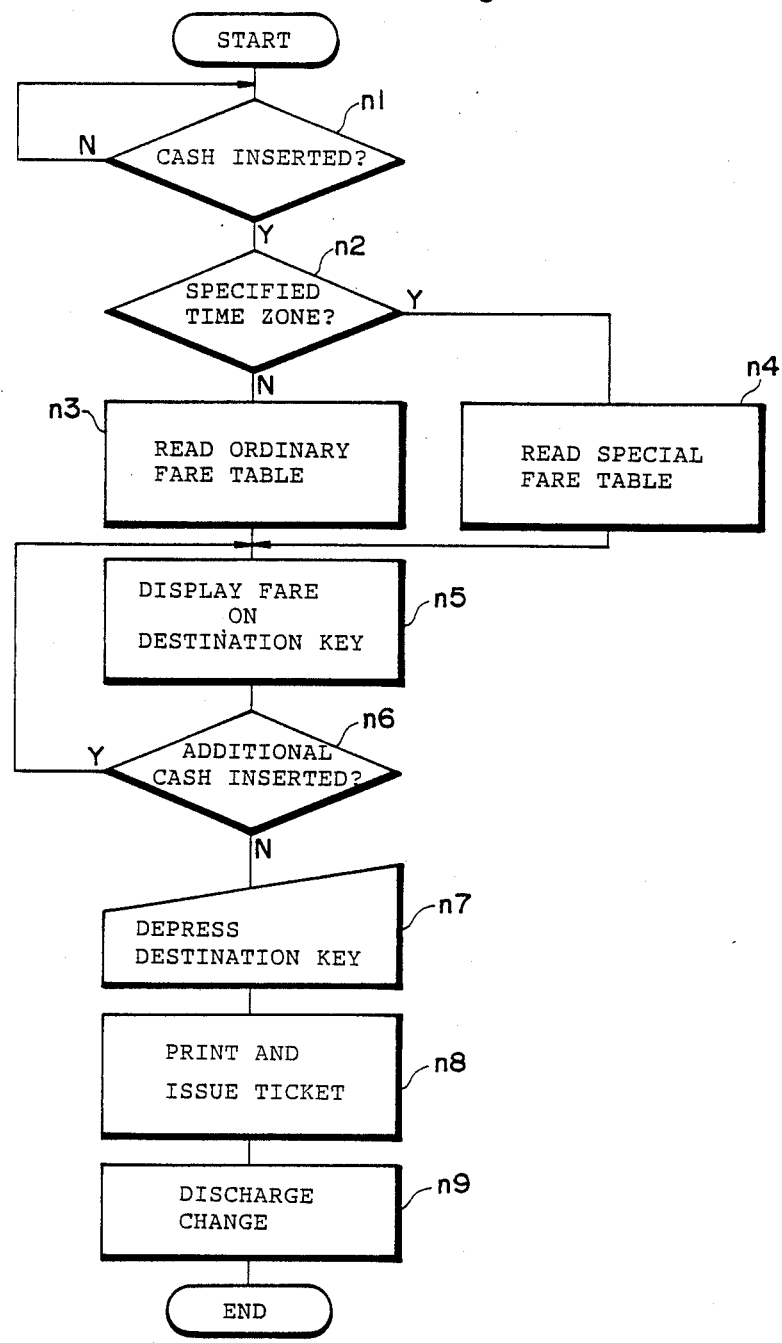
FIG. 3 is a flowchart for assistance in explaining the operation of the control section of the automatic ticket vending machine.

FIG. 3 shows a flowchart for assistance in explaining the operation of the control section of the automatic ticket vending machine. The CPU stands by until cash is inserted (in step n1). When cash is inserted, CPU checks the current time zone (in step n2). If the checked time zone is the ordinary time zone, CPU reads railway fares from the ordinary fare table (in step n3). If the checked time zone is the specified time zone, CPU reads railway fares from the specific fare table (in step n4). These read fares are displayed on the destination keys (in step n5) within a predetermined railway section range corresponding to the inserted amount of cash. However, when additional amount of cash is inserted, CPU returns from the step n6 to step n5. When a destination key 3 is depressed without inserting an additional key (in step n7), a railway ticket corresponding to a railway section determined by a depressed destination key 3 is printed and then issued (in step n8), and change is discharged or returned, where necessary (in step n9), to complete the control operation.

I claim:

1. An automatic ticket vending machine, comprising:
   (a) memory means for storing a first fee and a second fee different from said first fee;
   (b) calendar means for storing a specified day and time;
   (c) clock means for measuring a day and time; and
   (d) ticket issuing means for issuing tickets at said first fee when said day and time output from said clock means match said specified day and time stored in said calendar means and at said second fee when said day and time output from said clock means do not match said specified day and time stored in said calendar means.

2. The automatic ticket vending machine of claim 1, wherein said specified day and time is a specified time zone.

3. The automatic ticket vending machine of claim 1, wherein said specified day and time is a specified day of the week.

4. An automatic ticket vending machine, comprising:
   (a) memory means for storing a first fee schedule and a second fee schedule different from said first fee schedule;
   (b) calendar means for storing a specified day and time;
   (c) clock means for measuring a day and time;
   (d) fee displaying means for displaying a fee of said first fee schedule when said day and time outputs from said clock means match said specified day and time stored in said calendar means and a fee of said second fee schedule when said day and time outputs from said clock means do not match said specified day and time stored in said calendar means; and
   (e) ticket issuing means for issuing a ticket at said fee displayed by said fee displaying means.

* * * * *